J. B. COLLINS.
BREAD MIXER.
APPLICATION FILED JAN. 8, 1907.
905,148.
Patented Dec. 1, 1908.
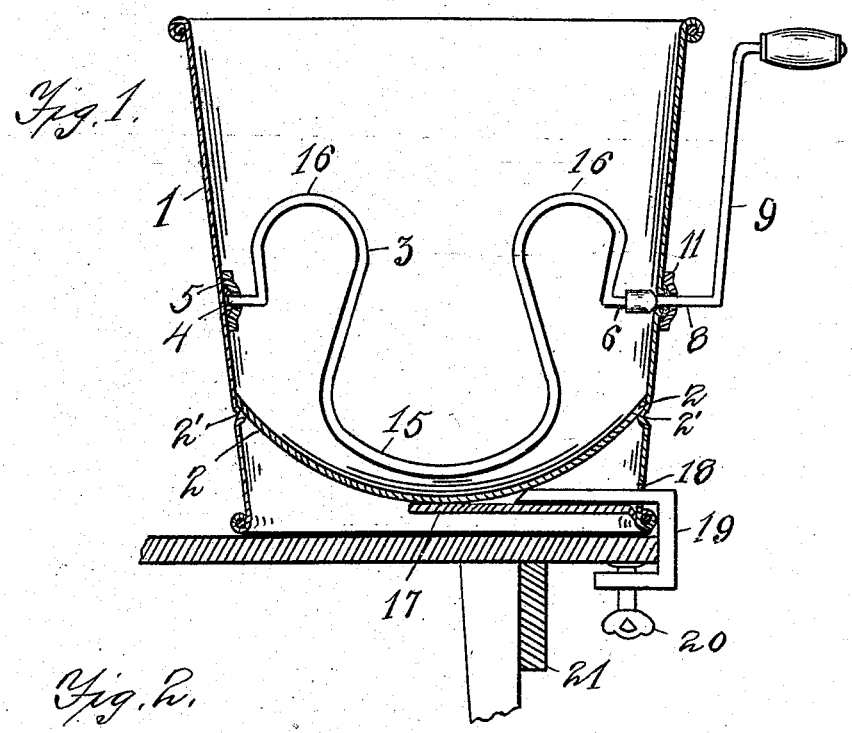
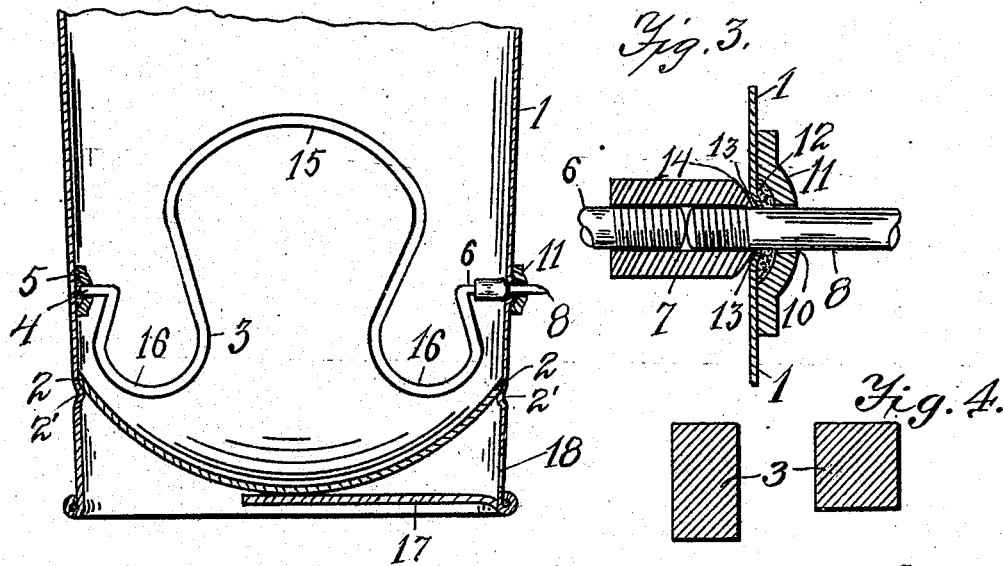

UNITED STATES PATENT OFFICE.

JOHN B. COLLINS, OF JAMESTOWN, NEW YORK, ASSIGNOR OF ONE-HALF TO CHARLES M. PURDY AND FRANK A. SMILEY, OF JAMESTOWN, NEW YORK.

BREAD-MIXER.

No. 905,148.         Specification of Letters Patent.         Patented Dec. 1, 1908.

Application filed January 8, 1907. Serial No. 351,393.

*To all whom it may concern:*

Be it known that I, JOHN B. COLLINS, a citizen of the United States, residing at Jamestown, in the county of Chautauqua and State of New York, have invented a new and useful Improvement in Bread-Mixers, of which the following, taken in connection with the accompanying drawing, is a full, clear, and exact description.

The invention relates to improvements in machines for mixing and kneading dough; and the object of my improvement is to provide a mixing rod of such shape that its action upon the dough is the same as the action of the human hands in mixing and kneading dough. This object is attained as shown in the accompanying drawings and further set forth in the description and claims.

In the drawings, Figure 1 is a sectional view of the mixing receptacle attached to a support, showing an elevation of the mixing rod in position for use. Fig. 2 is a like sectional view of the receptacle, showing the mixer in an inverted position from that shown in Fig. 1. Fig. 3 is a sectional view of the joint between the mixing rod and crank and the side of the receptacle. Fig. 4 shows sectional views of the mixing-rod.

Similar numerals refer to corresponding parts in the several views.

The numeral 1 indicates the receptacle which is preferably made in the form of a pail having a round bottom 2. The bottom 2 is preferably held in place by a crimp 2' in the side of the pail 1 upon which the bottom 2 may rest and be soldered firmly in place. This gives a form of receptacle which is easily cleaned and the circular bottom performs a further office hereinafter set forth.

The numeral 3 indicates the mixing rod which is preferably formed of an angular shaped steel rod having two outer and lesser wings 16, and a central wing 15, all bent in the same plane and substantially in the shape indicated. Therein lies the excellence of the mixer. The mixing rod 3 is horizontally supported on the opposite sides of the receptacle 1 the end 4 being received in a suitable bearing 5 at one side of the receptacle and the opposite end 6 having a sleeve 7 thereon with a thread cut within the opening in the same to receive the end 6 of the mixing rod 3 at one end and the end 8 of the crank 9 in the opposite end, an opening 10 being provided in the side of the receptacle 1 and having a plate 11 around the same with a packing 12 within the plate so that no liquids can escape through the opening 10. It is now apparent that the end 4 of the mixing rod 3 can be inserted in the bearing in the plate 5 and the end 8 of the crank 9 may be screwed into the sleeve 7 when it is sprung into place, the sides of the receptacle 1 being bent out slightly around the opening 10 as at 13, to form a slight indenture for the rounded end 14 of sleeve 7 to spring into and thereby more perfectly close the opening 10 and hold the end 7 in place to receive the end 8 of crank 9.

As above stated, the shape of mixing rod 3 is essential to the successful operation of my mixer, taken in connection with the circular form of the bottom 2 of the receptacle 1. The mixing rod 3 has a large central flexure or wing 15 which is semi-circular in form and is supported at such a distance from the bottom 2 as to mix and press the main portion of the dough as the mixing rod is revolved in the receptacle by means of the crank 9. The mixing rod is given two lesser side flexures 16 which are semi-circular in form and so proportioned in relation to the curve of bottom 2 and wing 15 that when turned adjacent to said bottom they stand in about the same relation to the curve of said bottom as the central flexure 15, the two positions of the mixing rod being clearly shown in Figs. 1 and 2.

It is now apparent that when the dough is placed in the pail and the mixing rod 3 is caused to revolve by turning crank 9, the action of the mixer will be precisely the same as that of the hands of the baker in kneading his dough. The two wings 16 throw the dough toward the center of the receptacle and the central flexure comes down through the dough simultaneously pressing and aerating the dough. Thus the pressure from the sides and the pressure at the center will alternate, just as a baker throws the dough together from the sides in the mixing bowl with his hands and then with both hands presses through and over it in kneading the dough. The rod form of mixer 3 allows the dough to pass through the loops of the different flexures and thereby the dough folds upon itself inclosing the air and thus aerating the dough and at the same time thoroughly mixing and beating the same.

It is apparent that the receptacle 1 must be held firmly in place and for this purpose a strip 17 is attached to the central portion of the bottom 2 of the pail and to the rim of the bottom at its outer side. A slot 18 is provided in the side of the receptacle above the lower rim and strip 17 to receive a small clamp 19 with a screw 20 for attaching the receptacle 1 firmly in place upon the support 21, as shown in Fig. 1.

A substantial square or rectangular rod, as shown in section in Fig. 4 is preferred as such a shaped rod catches on the dough and drags and pushes the dough, thereby beating and kneading the same, whereas a round rod slips through the dough, without kneading the same.

I claim as new:—

1. In a dough-mixer, a vertical receptacle having a concaved bottom, a mixing-rod bent into an arcuate ended central wing and two circular ended side wings placed oppositely in the same plane, a round ended sleeve on said mixing-rod, a crank threaded in said sleeve, said receptacle having an opening to receive said crank and a packing plate around said opening with suitable packing within the same, and a suitable bearing on the inner side of said receptacle for the opposite end of said mixing-rod, substantially as and for the purpose specified.

2. In a dough-mixer, a receptacle 1 having a concaved bottom 2, a mixing-rod 3 having a semi-circular ended central wing 15 and two arcuate ended wings 16 oppositely placed in the same plane with said central wing, a round ended sleeve 7 on said rod, a crank threaded in said sleeve, said receptacle having an opening 10 and plate 11 around said opening with packing 12 within said plate, substantially as and for the purpose specified.

In testimony whereof I have signed my name to this specification in the presence of two subscribing witnesses.

JOHN B. COLLINS.

Witnesses:
A. W. KETTLE,
I. A. ELSWORTH.